(12) United States Patent
Emmott et al.

(10) Patent No.: US 6,425,487 B1
(45) Date of Patent: Jul. 30, 2002

(54) WASTE DEPOSITORY

(75) Inventors: Stephen J. Emmott; Sarah Woods, both of London (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/307,529

(22) Filed: May 7, 1999

(51) Int. Cl.$^7$ .................................................. B07C 7/04
(52) U.S. Cl. ........................ 209/703; 209/583; 209/930; 220/500; 220/909
(58) Field of Search ................................ 209/583, 630, 209/702, 706, 707, 930, 703; 220/500, 533, 908, 909

(56) References Cited

U.S. PATENT DOCUMENTS 4,974,746 A * 12/1990 Dickinson ............... 209/702 X
5,257,577 A * 11/1993 Clark ....................... 209/706 X
5,361,913 A * 11/1994 Melchionna ............. 209/930 X
5,797,497 A * 8/1998 Edwards ................. 209/926 X

FOREIGN PATENT DOCUMENTS

FR          2691384   * 11/1993   ................. 209/706

* cited by examiner

Primary Examiner—Tuan N. Nguyen
(74) Attorney, Agent, or Firm—Francis L. Conte

(57) ABSTRACT

A depository for waste articles includes a chamber for storing waste articles and a control unit for determining a characteristic of a waste article presented to the depository for storage in the chamber.

33 Claims, 2 Drawing Sheets

WASTE DEPOSITORY

BACKGROUND OF THE INVENTION

The present invention relates to a waste depository and a method for operating such a waste depository. More particularly, the present invention relates to a domestic waste depository, such as a stand-alone trash bin or a remote waste container served by a local waste disposal hatch via an intermediate chute.

Presently, many householders compile a list of groceries and other domestic purchases (a shopping list) at least in part based on items previously consumed. Many householders find the exercise of compiling such a shopping list, prior to a shopping trip, to be tedious and time-consuming.

Additionally in recent years, there has been a world-wide increase in consciousness regarding the serious damage being caused to the environment by the disposal of waste products. This consciousness has led to a general desire to recycle waste products, particularly packaging products. Typically the problem is addressed by sorting household garbage into categories, such as glass products, plastics products, paper products and metal products, and loading the sorted products into separate containers, so as to facilitate subsequent recycling processes. Some countries now even require household garbage to be sorted in such a fashion, by law.

Even those householders who are fully appreciative of the benefits of recycling will still find sorting garbage to be time-consuming and perhaps rather unpleasant, due to the nature of the items being sorted. Occasionally, items may be placed in the wrong containers, either through a misunderstanding or simply through forgetfulness.

There is a need for an apparatus and method for obviating, or at least substantially reducing the amount of effort required by the householder in compiling a shopping list. Additionally, there is a need for an apparatus and method for facilitating the sorting of domestic waste products for the purposes of recycling.

SUMMARY OF THE INVENTION

Accordingly, the present invention provides a depository for waste articles comprising a lid assembly having an aperture for receiving waste articles, a sensor, and a control unit for determining a characteristic of a waste article presented to the depository for storage upon the basis of information detected by said sensor and a chamber for storing waste articles received via the aperture. Additionally, the present invention provides a method of operating a waste depository having a plurality of chambers comprising the steps of sensing a waste article in proximity to the waste depository; determining information about the waste article; and indicating an appropriate chamber for deposit of the waste article based on the information about the waste article.

Such an arrangement relieves the burden upon a user to analyze waste products being discarded and thus facilitates re-ordering and re-cycling exercises.

In a preferred embodiment, the depository comprises a plurality of chambers, each chamber (or hopper) being adapted for storing a waste article having a predetermined respective characteristic, wherein the control unit determines the predetermined characteristics and indicates which of the plurality of chambers corresponds to a given waste article.

Where present, these features particularly facilitate re-cycling, because the depository can automatically sort waste products into re-cycling categories.

The control unit may keep a log of waste articles received by the depository. The depository may also comprise communication means for connection to a remote computer, the control unit being adapted to request articles to replace waste articles received in the depository from the computer via the communication means. Such an arrangement can greatly facilitate shopping exercises because the depository can effectively assist in logging needs and re-ordering replacement products.

The sensor may comprise any RF sensing circuit for receiving an RF signal from a waste article or from RF transmission means provided on a waste article, for enabling the control unit to determine the characteristic of the waste article by interpreting the signal. This sensor provides a particularly effective way for the depository to analyze the articles it receives.

Alternatively or additionally, the sensor may comprise an optical reader for reading information visually presented on the waste article, in order to enable the control unit to determine the characteristic of the waste article. This sensor provides a particularly inexpensive way for the depository to analyze its contents, as the waste articles are received.

BRIEF DESCRIPTION OF THE DRAWINGS

Further objects and advantages will be apparent from the following description of exemplary embodiments of the invention which are described below and illustrated in the accompanying drawings in which.

DETAILED DESCRIPTION OF THE INVENTION

Figure 1:
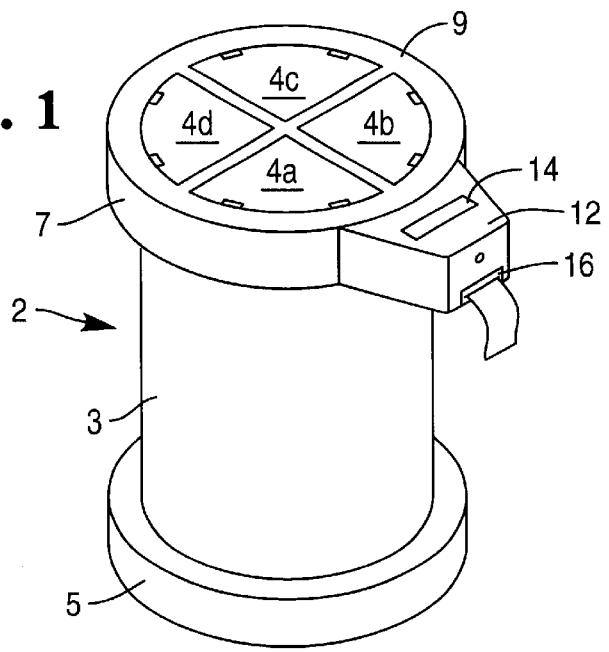
FIG. 1 is a schematic perspective view of a waste depository of the present invention.

The waste depository shown in the drawings is in the form of a domestic trash bin 2, and comprises a generally cylindrical body 3 situated upon a base 5 and provided with a lid assembly 7. It should be noted that the shape and configuration of the bin 2 may be varied significantly within the functionality of the invention and is not to be construed as limited to the particular arrangement shown in this particular embodiment.

The lid assembly 7 is provided with four flaps 4a, 4b, 4c and 4d, each being hinged to an annular frame portion 9 of the lid by a respective pair of hinges 6. Representative flap 4a is generally in the shape of a quarter circle and seals a correspondingly shaped aperture 11a in the upper surface of the lid assembly 7. Aperture 11a provides access to a chamber 22a situated within the body 3 of the bin 2. Similarly, flaps 4b, 4c and 4d seal corresponding apertures (not shown) providing access to corresponding chambers (not shown). In this embodiment, each chamber is quite separate from the others and waste items do not pass between chambers. Each chamber is intended to receive a specific category of waste; these typically being: glass, plastics, paper and metal.

Since each section (flap, aperture, chamber, etc.) are similar, representative flap 4a, aperture 11a and chamber 22a will be referenced in the discussion, but the discussion is equally applicable to the other sections. Flap 4a is provided with a respective electrically powered motor (not shown), which acts to rotate the flap 4a about its hinges. The action of the motor causes the associated flap 4a to move downwardly away from its respective aperture 11a, thereby opening the aperture 11a in such a manner as to enable waste items to be thrown through the aperture 11a and into the chamber 22a below.

The motors are all controlled by a control unit 12, which is fitted to one side of the frame portion 9 on the lid assembly 7 as shown in FIG. 1.

The frame portion 9 of the lid assembly 7 is further provided with a coil 8 that encircles all of the apertures (including aperture 11a) and is connected to the control unit 12. The coil 8 receives an RF signal, which is then supplied to a receiver in the control unit 12. As mentioned previously, various other sensors could be used instead of or in addition to coil 8.

The control unit 12 is further provided with a display 14 and a printer 16. The control unit 12 may include any controls means or any standard electronics such as but not limited to a microprocessor, signal processor, amplifier, etc. to provide the control functions as desired.

In this embodiment, the display is a simple liquid crystal display (LCD), but other types of display could be used. The printer may be of any suitable type including inkjet or thermal types.

Figure 2:
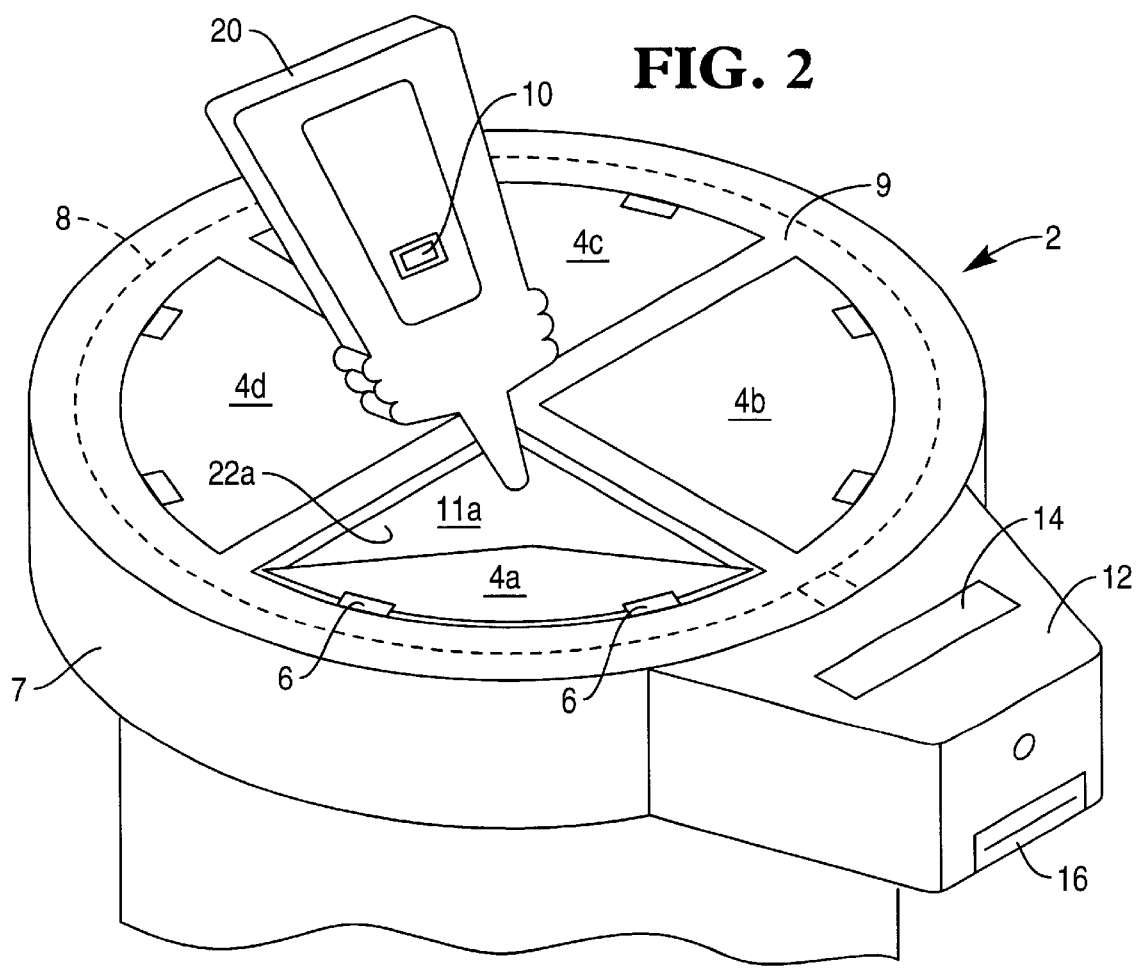
FIG. 2 is an enlarged perspective view of the top portion of the waste depository of FIG. 1, in use.

The illustrated bin 2 is intended to be used with waste articles that are provided with radio tags. An example of such a waste article 20 is shown in FIG. 2 having a radio tag 10 thereon.

In use, the control unit 12 energizes the coil 8 once every second. If a tagged article 20 is within a predetermined range, the tag 10 receives and stores energy from the coil 8. When the tag 10 has stored enough energy, the tag 10 is then able to send to the coil 8 (and hence the receiver provided in the control unit 12) its code number, via an RF signal. This transmission is done within a few milliseconds of receiving the energizing pulse from the coil 8.

The control unit 12, upon receipt of such a signal from a tag 10, analyses the signal and reads the code number. The code number will, in this case, contain two types of information. The first information type relates to the nature of the consumable product associated with the waste article 20. For example, if the waste article 20 is an empty vegetable oil bottle (as shown in FIG. 2), the code number will include information to enable the control unit 12 to determine that the waste article 20 formerly contained a specific quantity of vegetable oil, manufactured by a specific manufacturer. The second information type in the code number will also enable the control unit 12 to determine that the waste article 20 is a plastics product, possibly with a paper label.

Upon receiving this information, the control unit 12 will activate an appropriate one of the motors, opening an appropriate one of the flaps 4a, 4b, 4c or 4d, so that the bottle can be dropped into the chamber that is suitable for plastics items. Thus, the control unit 12 indicates which chamber is appropriate for the waste item. However, before doing this, the display 14 can prompt the user to remove the paper label, if so desired. The system may also be configured to give the user other helpful instructions upon the treatment of waste products to be placed therein.

As a second process, the control unit 12 also records the product associated with waste article 20 (in this example a quantity of vegetable oil) in a "shopping list". The shopping list can be printed out via the printer 16. Alternatively, the list can be transmitted, via a modem and telephone line or an electricity line to a grocery store or a supermarket. In such a case, the items on the list can be collected together at the store and subsequently delivered to the user's home.

If desired, the control unit 12 can also compile a listing of the waste materials (in the illustrated example a quantity of plastics would be added to the list), which can be transmitted, via the modem and telephone line, to a recycling organization, for subsequent collection.

The body portion 3 of the illustrated bin 2 is made from stainless steel and the lid assembly 7 and base 5 are made largely from plastics. The chambers or hoppers are made from plastics or stainless steel for ease of cleaning. As a further measure to facilitate cleaning, the chambers or hoppers may be removable from the body portion 3. In the illustrated embodiment, the lid assembly 7 is removable so that it can be lifted off to access the chambers or hoppers.

Other suitable materials may, of course, be used.

Figure 3:
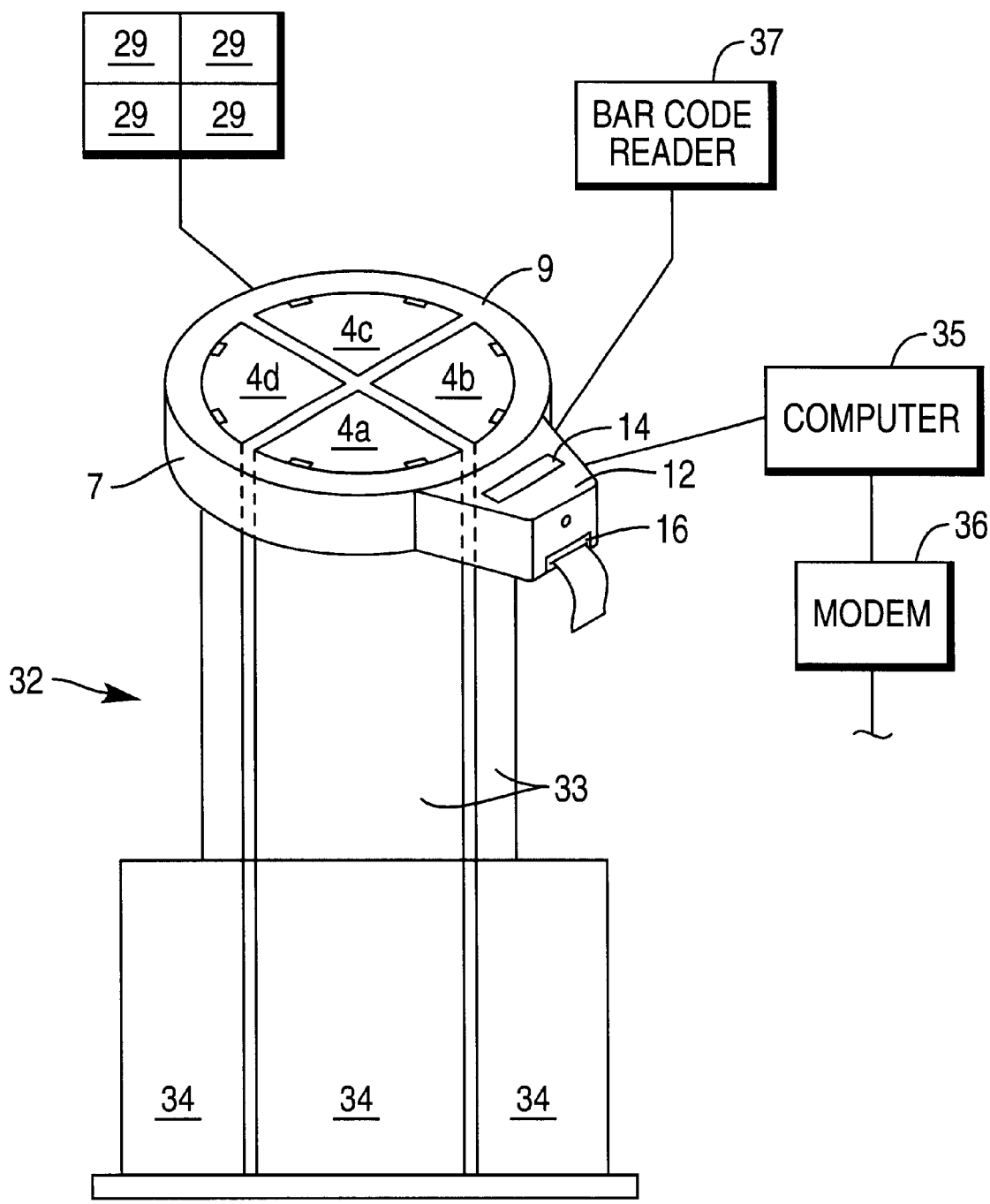
FIG. 3 is a schematic view of a waste disposal system in accordance with further embodiments.

Although this embodiment takes the form of a largely self-contained waste depository 2, the main components of the lid assembly 7 could, instead, be provided at the access hatch of a waste disposal system 32 shown in FIG. 3. The system would then represent a waste depository, in accordance with the invention. In such a case, each aperture would provide access to a respective sub-chute 33 which would feed a much larger waste chamber or hopper 34, which would be typically provided at a location somewhat remote from the lid assembly. Such an arrangement would typically be used in shared accommodation, such as an apartment block, where a plurality of waste chutes would feed communal chambers or hoppers.

The control unit 12 can be configured so that it not only records the nature of an article being presented to the waste depository, or the contents previously associated with the article, but also information regarding the appropriate treatment of the article. For example, if the waste depository did not contain a chamber or hopper for receiving glass articles, it could present a message on the display, advising the user that the glass articles should, instead, be taken to a bottle bank. In such a case, the control unit 12 could be configured so as to maintain all of the flaps 4a, 4b, 4c, 4d in a closed position and thereby prevent the user from putting a glass article into the waste depository.

Although the above embodiment is provided with a series of flaps 4a, 4b, 4c, 4d, each providing access to a respective chamber, it is equally possible that a single flap, door or lid, could be provided (which could be manually operated by a foot pedal or the like) and access to the various chambers or hoppers could be provided by means of a rotating element with a single aperture, situated below the lid. In such a case, the control unit merely causes the rotating element to rotate to such a position that the aperture is located over an appropriate one of the hoppers.

In a further alternative arrangement, a respective light emitting diode (LED) 29 or the like is provided next to each chamber or hopper and the control unit 12 merely causes an appropriate one of the LEDs to light, to indicate which hopper an article should be placed into. In such a case there would be no need for the control unit 12 to operate flaps or the like and each chamber or hopper could instead be sealed with a respective manually operated door.

The depository 2 may be further provided with a key pad or the like, coupled to the control unit 12, which would enable the shopping list to be edited by the user. Furthermore, the depository 2 may be networked to other systems within the home, so that a more sophisticated inventory may be kept. For example, a PC-based ordering facility may be used for ordering groceries from a supermarket via a computer 35, modem 36, and a telephone line or electricity line and the control unit 12 of the depository 2 could be networked with the PC. This would enable the control unit to modify an inventory of items maintained by software stored on the PC, so as to enable the user to take into account the items disposed of when making their next grocery order via the PC. The depository 2 could also be connected to a wireless or wired network resource management system comprising other domestic appliances.

The ability to edit the shopping list, either using a separate component in a network or using a key pad directly on the depository, has the benefit of preventing orders automatically being made for items which are used only infrequently or which the user does not want to order again, for whatever reason.

Although the above embodiments make use of RF transmissions to identify the nature of articles being presented to the depository 2, other means of identification are possible. For example, the depository 2 could be provided with a laser bar code reader 37, for reading bar codes such as those already commonly provided on many consumable articles. One minor disadvantage of such a configuration is that it would be necessary for the user to present the bar code to the bar code reader. However, such a system would have the advantage of making use of relatively inexpensive technology which is already widely in place.

Many other means of transmitting data between the container and the articles presented to it are possible. These include magnetic means.

An important aspect of the present invention is that the sensor is provided in combination with the waste container.

Many further modifications and variations will suggest themselves to those versed in the art upon making reference to the foregoing illustrative embodiments, which are given by way of example only and which should not be taken to limit the scope or spirit of the invention, that being determined by the appended claims.

What is claimed is:

1. A depository for receiving waste articles from a user comprising:
   a plurality of chambers for correspondingly storing different types of said waste articles;
   a lid covering said chambers, and having a plurality of apertures providing access to corresponding ones of said chambers;
   a sensor adjacent said apertures;
   a control unit operatively joined to said sensor for identifying a waste article presented by said user within range of said sensor; and
   means operatively joined to said control unit for visually indicating to said user which of said chambers is intended to receive said waste article identified by said control unit.

2. A depository according to claim 1 wherein said indicating means are configured for presenting to said user a plurality of visual indications provided next to associated ones of said chambers.

3. A depository according to claim 2 wherein said indicating means comprise a plurality of flaps mounted to said lid to cover corresponding ones of said apertures, with each flap being movable to provide access to a corresponding one of said chambers for receiving said waste article identified by said control unit.

4. A depository according to claim 3 wherein said sensor comprises a coil disposed in said lid encircling said apertures.

5. A depository according to claim 4 wherein said control unit is configured to energize said coil to radiate energy.

6. A depository according to claim 4 wherein said control unit is configured to analyze RF signals received by said coil to identify said waste article.

7. A method of using said depository according to claim 4 comprising:
   presenting within range of said sensor coil a waste article having a radio tag thereon;
   energizing said coil to transmit energy to said tag for radiating an RF signal therefrom identifying said waste article;
   analyzing in said control unit said RF signal received from said coil to identify said waste article;
   opening one of said flaps covering a corresponding one of said apertures; and
   dropping said waste article into a corresponding chamber through said open flap.

8. A depository according to claim 4 further comprising:
   a display operatively joined to said control unit; and
   a printer operatively joined to said control unit.

9. A depository according to claim 8 wherein said control unit is further configured to record a log of waste articles received in said chambers.

10. A depository according to claim 4 wherein said indicating means comprise a plurality of lights corresponding to respective ones of said chambers.

11. A depository for waste articles comprising:
    a lid assembly having a plurality of apertures for receiving waste articles,
    a sensor adjacent said apertures,
    a control unit operatively joined to said sensor for determining a characteristic of a waste article presented to the depository for storage upon the basis of information detected by said sensor,
    a plurality of chambers disposed below corresponding ones of said apertures for storing waste articles having a predetermined respective characteristic and received via the aperture; and
    means operatively joined to said control unit for visually indicating which of said plurality of chambers corresponds to a given waste article identified by said control unit from said predetermined characteristic.

12. A depository according to claim 11 wherein said indicating means comprises closure means, said closure means being operable by said control unit, for enabling its associated chamber to receive a waste article when said control unit determines that the article has a predetermined characteristic that renders the article suitable for storage within the chamber associated with that particular closure means.

13. A depository according to claim 12, wherein said closure means is a hinged flap being provided with a respective motor for causing rotation of the flap about its hinge, said motor being controlled by said control unit.

14. A depository according to claim 11 wherein said indicating means comprise a plurality of visual indicators, each said indicator being associated with a respective one of said chambers, said control unit being configured to operate said indicators to indicate which of the chambers should accept a given waste article on the basis of said characteristic of said article determined by said control unit.

15. A depository according to claim 11, wherein said control unit is configured for keeping a log of waste articles received by said depository.

16. A depository according to claim 15, further comprising communication means for connection to a remote computer, said control unit being configured to request articles to replace waste articles received in the depository from said computer via said communication means.

17. A depository according to claim 16, wherein said communication means comprises a modem.

18. A depository according to claim 11, further comprising a display for displaying identification information relating to any waste article presented to the depository.

19. A depository according to claim 11, further comprising a printer, for printing identification information relating to any waste article presented to the depository.

20. A depository according to claim 11, further comprising data input means, for enabling a user to enter or edit data relating to any waste article presented to the depository or to be presented to the depository.

21. A depository according to claim 11, wherein said sensor comprises a circuit for receiving an RF signal from a waste article or from RF transmission means provided on a waste article, for enabling the control unit to determine said characteristic of said waste article by interpreting said signal.

22. A depository according to claim 12, comprising a transmitter for transmitting power to a waste article or transmission means provided on a waste article.

23. A depository according to claim 21, wherein said sensor includes an induction coil.

24. A depository according to claim 11, wherein said sensor comprises an optical reader for reading information visually presented on said waste article, in order to enable said control unit to determine said characteristic of said waste article.

25. A depository according to claim 11, wherein one of said chambers is configured for receiving waste articles made substantially from glass.

26. A depository according to claim 11, wherein one of said chambers is configured for receiving waste articles made substantially from paper.

27. A depository according to claim 11, wherein one of said chambers is configured for receiving waste articles made substantially from metal.

28. A depository according to claim 11, wherein one of said chambers is configured for receiving waste articles made substantially from plastics.

29. A depository according to claim 11, wherein said depository is in the form of a stand-alone trash bin.

30. A depository according to claim 11, wherein the depository is in the form of a waste disposal system, comprising a plurality of chutes cooperating with associated ones of said apertures through which waste articles are received and the chambers are connected to the chutes.

31. A method of operating a waste depository having a plurality of chambers according to claim 11 comprising the steps of:
  sensing a waste article in proximity to the waste depository;
  determining information about the waste article; and
  indicating an appropriate chamber for deposit of the waste article based on the information about the waste article.

32. The method of operating a waste depository of claim 31 wherein the step of indicating an appropriate chamber for deposit of the waste article based on the information about the waste article includes opening a flap corresponding to the appropriate chamber.

33. The method of operating a waste depository of claim 31 wherein the step of sensing a waste article in proximity to the waste depository includes reading a bar code on the waste article.

* * * * *